US012724168B2

(12) United States Patent
Fondement et al.

(10) Patent No.: US 12,724,168 B2
(45) Date of Patent: Sep. 1, 2026

(54) DEVICE FOR EVALUATING A URANIUM CONTENT AND A HYDROGEN POROSITY OF A PARTICULAR REGION IN A GEOLOGICAL FORMATION WHEN DRILLING AND ASSOCIATED METHOD

(71) Applicants: Orano Mining, Chatillon (FR); Commissariat à l'énergie atomique et aux énergies alternatives, Paris (FR)

(72) Inventors: Valentin Fondement, Saint-Paul-lez-Durance (FR); Bertrand Perot, Venelles (FR); Thomas Marchais, Saint-Paul-lez-Durance (FR); Hervé Toubon, Les Essarts-le-Roi (FR); Youcef Bensedik, Tours (FR)

(73) Assignees: Orano Mining, Chatillon (FR); Commissariat à l'énergie atomique et aux énergies alternatives, Paris (FR)

( * ) Notice: Subject to any disclaimer, the term of this patent is extended or adjusted under 35 U.S.C. 154(b) by 235 days.

(21) Appl. No.: 18/699,699

(22) PCT Filed: Oct. 10, 2022

(86) PCT No.: PCT/EP2022/078100
§ 371 (c)(1),
(2) Date: Nov. 4, 2024

(87) PCT Pub. No.: WO2023/061940
PCT Pub. Date: Apr. 20, 2023

(65) Prior Publication Data

US 2025/0327943 A1 Oct. 23, 2025

(30) Foreign Application Priority Data

Oct. 11, 2021 (FR) ..................................... 21 10722

(51) Int. Cl.
*G01V 5/10* (2006.01)
*G01V 5/06* (2006.01)

(52) U.S. Cl.
CPC ................ *G01V 5/105* (2013.01); *G01V 5/06* (2013.01)

(58) Field of Classification Search
None
See application file for complete search history.

(56) References Cited

U.S. PATENT DOCUMENTS 3,264,477 A 8/1966 Hall, Jr.
4,209,694 A 6/1980 Mills, Jr.
(Continued)

FOREIGN PATENT DOCUMENTS

RU 2073894 C1 2/1997
RU 2330311 C1 7/2008
(Continued)

OTHER PUBLICATIONS

International Search Report for PCT/EP2022/078100.
(Continued)

*Primary Examiner* — Hoon K Song
(74) *Attorney, Agent, or Firm* — Davidson Kappel LLC

(57) ABSTRACT

A device for evaluating uranium content and hydrogen porosity while drilling includes a probe having a pulsed neutron generator for emitting a pulse of neutrons, a single neutron detector, a neutron counting unit for measuring over time a number of neutrons backscattered from hydrogen nuclei and a number of prompt fission neutrons resulting from interactions with uranium nuclei. The device also includes a hydrogen porosity evaluation unit for evaluating the hydrogen porosity using a total number of backscattered
(Continued)

neutrons and a uranium evaluation unit for evaluating the uranium content using a total number of prompt fission neutrons.

10 Claims, 5 Drawing Sheets

(56) References Cited

U.S. PATENT DOCUMENTS

| | | | | |
|---|---|---|---|---|
| 4,239,965 | A | 12/1980 | Oliver et al. | |
| 4,625,110 | A | 11/1986 | Smith, Jr. | |
| 2013/0048849 | A1* | 2/2013 | Li | G01V 5/101 250/269.8 |
| 2021/0287821 | A1* | 9/2021 | Crichlow | B01J 20/0288 |
| 2022/0066064 | A1* | 3/2022 | Al-Garni | G01V 1/40 |
| 2022/0090481 | A1* | 3/2022 | Aljedaani | G06N 3/08 |
| 2025/0383470 | A1* | 12/2025 | Zhou | G01V 5/102 |

FOREIGN PATENT DOCUMENTS

| | | | |
|---|---|---|---|
| RU | 2476671 | C1 | 2/2013 |
| RU | 2784205 | C1 | 11/2022 |

OTHER PUBLICATIONS

Search Report FR2110722.

Humphreys D. R et al.: “Uranium Logging with Prompt Fission Neutrons”, International Journal of Applied Radiation and Isotopes, vol. 34. No. 1, Jan. 1, 1983, pp. 261-268; figures pp. 264.

* cited by examiner

-28-
-30-
-26-
-12-
18
20
22
24
34
10
14
32
42
16
36
38
40
L
U
H

DEVICE FOR EVALUATING A URANIUM CONTENT AND A HYDROGEN POROSITY OF A PARTICULAR REGION IN A GEOLOGICAL FORMATION WHEN DRILLING AND ASSOCIATED METHOD

CROSS-REFERENCE TO RELATED APPLICATIONS

This application is the U.S. National Phase of PCT Appl. No. PCT/EP2022/078100 filed Oct. 10, 2022, which claims priority to FR 21 10722, filed Oct. 11, 2021, the entire disclosures of which are incorporated by reference herein.

TECHNICAL FIELD

The present disclosure relates, according to a first aspect, to a device for evaluating, in a borehole, a uranium content and a hydrogen porosity of a region of interest of a geological formation.

BACKGROUND

According to a second aspect, the present disclosure relates to an associated method for evaluating, in a borehole, the uranium content and the hydrogen porosity of the region of interest.

SUMMARY

In uranium prospecting and mining exploration, it is known how to evaluate the uranium content in a borehole and the hydrogen porosity by active neutron interrogation. The above is usually done using two distinct probes lowered into the borehole for evaluating both the porosity and the uranium content. Uranium content and hydrogen porosity are two important properties in mining exploration. Same are needed for building geological and hydraulic models, and for evaluating the uranium-related potential of a region or, when a deposit has been discovered, to evaluate the reserves thereof.

Hydrogen porosity is the fraction of the pore volume of a formation occupied by water. Same is directly related to the amount of hydrogen atoms present in the formation.

The active neutron interrogation method consists in emitting neutrons towards the region of interest for which one wants to know the hydrogen porosity and the uranium content. Emitted neutrons interact with both hydrogen nuclei and uranium nuclei present in the region of interest. Some of the neutrons emitted are backscattered by the hydrogen nuclei toward the probe, while conserving a high energy, typically greater than 0.5 eV [which is] the cut-off energy of cadmium surrounding the detector in some probes. Other emitted neutrons thermalize in the formation, i.e. the neutrons slow down following successive shocks with hydrogen nuclei present in the region of interest. Some of the thermal neutrons cause the fission of uranium-235 nuclei and the emission, by fission, of 2 to 3 prompt neutrons with an average energy on the order of 2 MeV.

To evaluate the hydrogen porosity of the formation, it is known how to use a probe comprising a neutron source and at least two detectors sensitive to thermalized neutrons (or thermal neutrons) in the formation that have been backscattered and have an energy around 0.025 eV. The hydrogen porosity is determined from the ratio of the counting rates measured by the two detectors. The ratio first increases linearly with porosity and then converges at high porosity toward a limit value, which makes the accurate determination of porosity difficult typically when the porosity exceeds 40%.

To determine the uranium content of the formation, it is known how to carry out a count of the prompt neutrons from the fission of uranium 235 nuclei induced by the thermalized neutrons coming from a pulsed generator of initially fast neutrons. More particularly, between the pulses of the generator a ratio is measured between a counting rate of the thermal neutrons coming from the generator and a counting rate of the prompt fission neutrons called epithermal neutrons, i.e. which have an energy greater than 0.5 eV.

A subject matter of the present disclosure is to propose a compact drilling devices which makes it possible to jointly evaluate, in a reliable and precise way, the uranium content and the hydrogen porosity of a region of interest of the geological formation.

To this end, the present disclosure relates to a device for evaluating, in a borehole, a uranium content and a hydrogen porosity of a region of interest of a geological formation, the device comprising:

- a probe intended to be inserted into a borehole facing the zone of interest, the probe including a pulsed neutron generator configured to emit at least one neutron pulse, at least part of said neutrons being emitted toward the region of interest, a single neutron detector arranged offset from the pulsed neutron generator, said neutron detector being suitable for detecting a plurality of neutrons resulting from interactions between neutrons emitted by the neutron generator and the region of interest, the probe further comprising a shielding device surrounding the neutron detector, the shielding device being suitable for absorbing a plurality of neutrons having an energy less than a cutoff energy, and resulting from interactions between the neutrons emitted by the neutron generator and the region of interest,
- a neutron counting unit connected to the neutron detector, the neutron counting unit being at least configured to measure, over time, during a first time interval, a number of neutrons backscattered by hydrogen nuclei of the region of interest and to measure, over time, during a second time interval, a number of prompt fission neutrons resulting from interactions between the neutrons emitted by the neutron generator and uranium nuclei present in the region of interest, the second time interval being subsequent to the first time interval,
- a hydrogen porosity evaluation unit configured to evaluate the hydrogen porosity of the region of interest using a total number of neutrons measured during the first time interval,
- a uranium evaluation unit configured to evaluate the uranium content of the region of interest using a total number of neutrons measured during the second interval.

According to the present disclosure, starting from a probe equipped with a single detector and e.g. by means of a single acquisition sequence which comprises a plurality of cycles of neutron pulses and of counting neutrons detected by the detector, and by applying the method described hereinbelow, it is possible to determine two parameters: the uranium content and the porosity of a region of interest.

According to particular embodiments, the device comprises one or more of the following features, taken individually or according to all technically possible combinations:

- the probe comprises a moderator arranged between the shielding device and the neutron detector, the moderator being suitable for slowing down the neutrons that have passed through the shielding device;

the pulsed neutron generator and the neutron detector extend along a direction substantially merged with or parallel to a main elongation direction of the probe;

the uranium content evaluated by the uranium evaluation unit is substantially proportional to the total number of neutrons measured during the second time interval;

the uranium evaluation unit is configured to determine the uranium content by using the hydrogen porosity evaluated by the hydrogen porosity evaluation unit;

the uranium evaluation unit is configured to correct the evaluated uranium content using a parameter representative of the variation over time in the number of neutrons measured during the second time interval; and the hydrogen porosity evaluation unit is further configured to evaluate the hydrogen porosity by using a distance between the probe and an inner wall of the borehole.

The present disclosure further relates to a method for the evaluation, in a borehole, of a uranium content and of a hydrogen porosity of a region of interest of a geological formation, using an evaluation device as described hereinabove, the method comprising the following steps:

emitting at least one neutron pulse with the neutron generator, at least part of said neutrons being emitted toward the region of interest;

performing at least one first measurement, the first measurement comprising a measurement during the first time interval of a number of backscattered neutrons resulting from interactions between neutrons of the pulse and hydrogen nuclei of the region of interest, performing at least one second measurement, the second measurement comprising a measurement during the second time interval of a number of fission prompt neutrons resulting from interactions between neutrons of the pulse and of uranium nuclei present in the region of interest;

evaluating the hydrogen porosity of the region of interest by using the first measurement; and evaluating the uranium content of the region of interest by using the second measurement.

According to other particular embodiments, the method comprises one or more of the following features, taken individually or according to all technically possible combinations:

the uranium content evaluation is performed using the evaluated hydrogen porosity; and the hydrogen porosity evaluation is performed by using a distance between the probe and a borehole wall.

BRIEF SUMMARY OF THE DRAWINGS

The present disclosure will be better understood upon reading the following description, given only as an example and making reference to the drawings, amongst which.

DETAILED DESCRIPTION

Hereinafter in the description, all the numerical simulations are carried out using a code modeling the transport of neutrons and more broadly all the interactions between the matter and the different radiations. The code used is e.g. the Monte-Carlo N-particle (MCNP) code [MCNP6TM, User's manual—version 1.0-LA-CP-13-00634, rev. 0—May 2013—Denise B. Pelowitz, editor Los Alamos National Laboratory].

Figure 1:
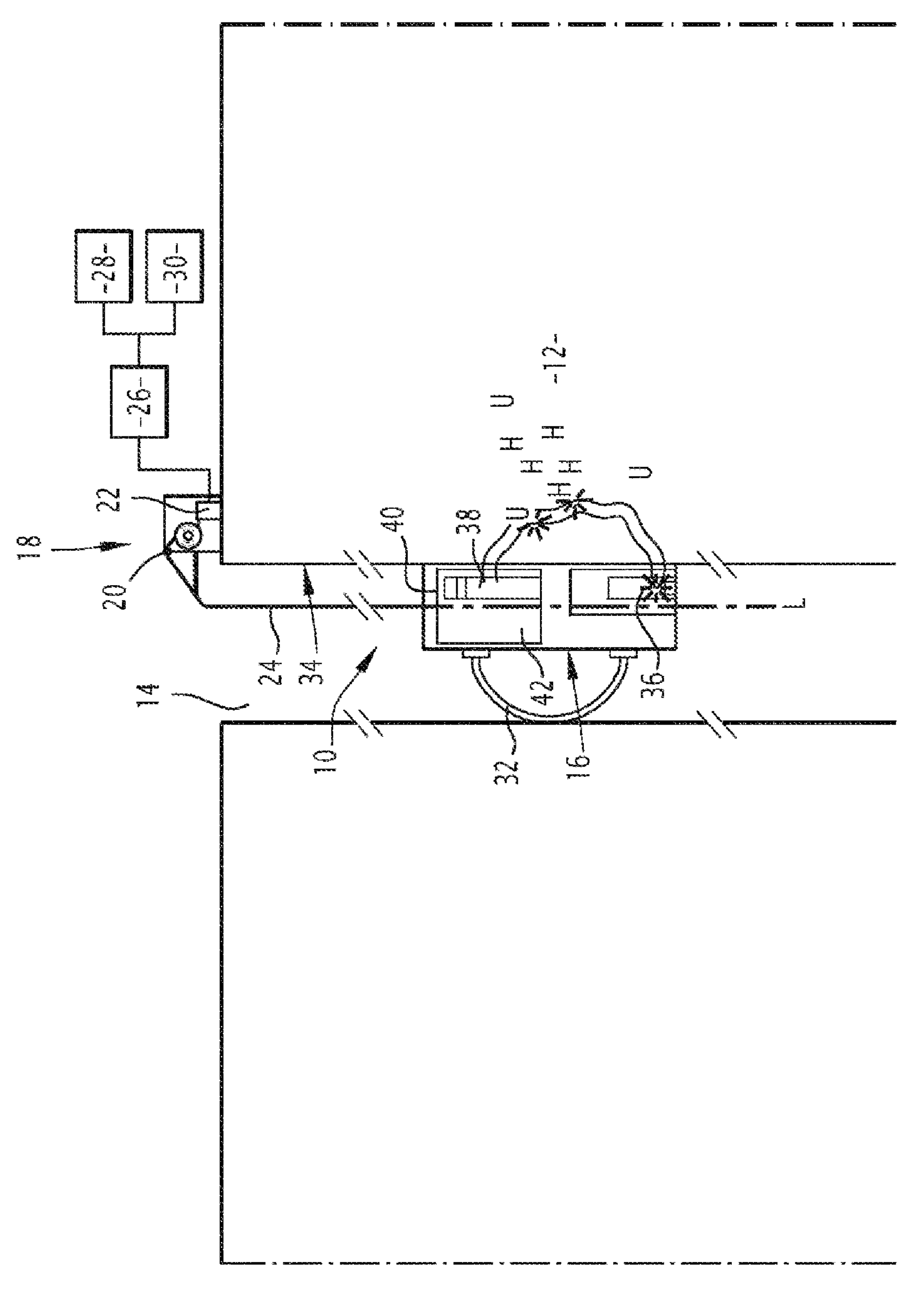
FIG. 1 is a schematic representation of a device according to the present disclosure.

FIG. 1 schematically represents a borehole evaluation device 10 of a uranium content and a hydrogen porosity of a region of interest 12 of a geological formation.

The borehole 14 runs through the region of interest 12. For simplicity, the borehole 14 is represented as being vertical in FIG. 1, i.e. with a dip equal to 90°. In a variant, the borehole 14 is not vertical and has an arbitrary dip and an arbitrary azimuth.

The borehole 14 is drilled through a plurality of geological formations. For example, the borehole 14 is drilled for exploration purposes, for searching for a uranium deposit, if any. In a variant, the borehole 14 is drilled for the purpose of developing an identified deposit. The information collected in borehole 14 is then used to estimate the uranium reserves of the deposit. The borehole 14 is filled with fluid, e.g. water, at least opposite the region of interest 12.

The device 10 comprises a probe 16 intended to be inserted into the borehole 14 facing the region of interest 12, a surface installation 18 serving to move the probe 16 along the borehole 14 upwards and downwards in the direction of continuation of the borehole 14. For example, the surface installation 18 comprises a winch 20 and a device 22 suitable for knowing the position of the probe 16 inside the borehole 14, e.g. an encoder wheel. The probe 16 is connected by a cable 24 to the surface installation 18. The cable 24 is used for the displacement of the probe 16 inside the borehole 14, for the electrical supply of the probe 16 and for the transfer to the surface of the measurements made by the probe 16.

The device 10 further comprises a neutron counting unit 26 connected to the probe 16, a hydrogen porosity evaluation unit 28 and a uranium content evaluation unit 30. The units 26, 28, 30 are e.g. integrated into the probe 16 or offset on the surface as illustrated schematically in FIG. 1.

Preferentially, the device 10 further comprises an eccentric part 32 suitable for pressing the probe 16 against a wall 34 of the borehole 14.

The probe 16 comprises a pulsed neutron generator 36, a single neutron detector sensitive essentially to thermal neutrons 38, and a shielding device 40 made of a material absorbing thermal neutrons surrounding the neutron detector 38.

Preferentially, the probe 16 comprises a moderator 42 arranged between the shielding device 40 and the neutron detector 38.

The probe 16 extends along a main elongation direction L. When the probe 16 is inside the borehole 14, the main elongation direction L is substantially merged with the main elongation direction of the borehole 14.

The pulsed neutron generator 36 is configured to emit at least one neutron pulse. At least some of the neutrons are emitted toward the region of interest 12, the pulsed neutron generator 36 emitting the neutrons isotropically. Preferentially, the neutron generator 36 is configured to emit a plurality of neutron pulses forming a periodic signal.

The frequency of the transmission signal is e.g. between 100 Hz and 10 KHz, e.g. equal to 200 Hz. The pulsed neutron generator 36 preferentially has an average neutron emission greater than $10^7$ neutrons per second, e.g. $10^8$ neutrons per second. Each pulse has a duration comprised e.g. between 5 μs and 500 μs.

The duty cycle, also known as the duty factor, which corresponds to the ratio between the duration of the pulse and the period of the signal emitted by the neutron generator 36, is e.g. less than 10%, preferentially less than 1%.

The pulsed neutron generator 36 is e.g. a deuterium-tritium or a deuterium-deuterium generator suitable for emitting a neutron flux having an energy greater than 2 MeV, e.g. 14 MeV for a deuterium-tritium generator or 2.5 MeV for a deuterium-deuterium generator.

The neutron detector 38 is suitable for detecting a plurality of neutrons resulting from interactions between the neutrons emitted by the neutron generator 36 and the region of interest 12.

The neutron detector 38 is arranged away from the pulsed neutron generator 36. The neutron detector 38 and the neutron generator 36 preferentially extend substantially along the same direction merged with or parallel to the main elongation direction L of the probe 16.

For example, as illustrated in FIG. 1, the neutron detector 38 is arranged with respect to the neutron generator 36 so that when the probe 16 is inserted into the borehole 14, the neutron detector 38 is located above the neutron generator 36 in a direction of elevation. In a variant, the neutron detector 38 is arranged below the neutron generator 36 along the direction of elevation.

The neutron detector 38 is e.g. a helium gas proportional counter 3. In a variant, the neutron detector 38 is a boron-lined proportional counter.

The shielding device 40 is suitable for absorbing a plurality of low-energy neutrons having an energy lower than a cut-off energy and resulting from interactions between the emitted neutrons and the region of interest 12.

The shielding device 40 completely surrounds the neutron detector 38, i.e. same defines a closed internal volume receiving the neutron detector 38.

The shielding device 40 is e.g. made of cadmium or boron. The shielding device 40 has e.g. a thickness comprised between 1 mm and 1 cm depending on the material used.

The cut-off energy depends on the nature of the material of the shielding device 40. For example, the cut-off energy is comprised between 0.1 eV and 10 eV, e.g. 0.5 eV for cadmium. Thereby, low energy neutrons with an energy lower than the cut-off energy are absorbed by the shielding device 40 and are not detected by the neutron detector 38. High-energy neutrons, with an energy greater than the cut-off energy, contribute to the signal measured by the neutron detector 38. Hereinafter in the description, the neutrons absorbed by the shielding device 40 will be described as "thermal neutrons" or "low energy neutrons" and the neutrons which pass through the shielding device 40 to reach the neutron detector 38 will be described as "epithermal neutrons" or "high energy neutrons".

Advantageously, a moderator 42 is arranged inside the shielding device receiving the neutron detector 38 to slow down the fission neutrons that have passed through the shielding device 40, i.e. the epithermal neutrons. The above facilitates the counting of neutrons by the neutron detector 38.

The moderator 42 completely surrounds the neutron detector 38. Preferentially, the moderator 42 is formed by a polyethylene layer interposed between the shielding device 40 and the neutron detector 38. In a variant, the moderator 42 consists of a polyolefin compound.

Figure 2:
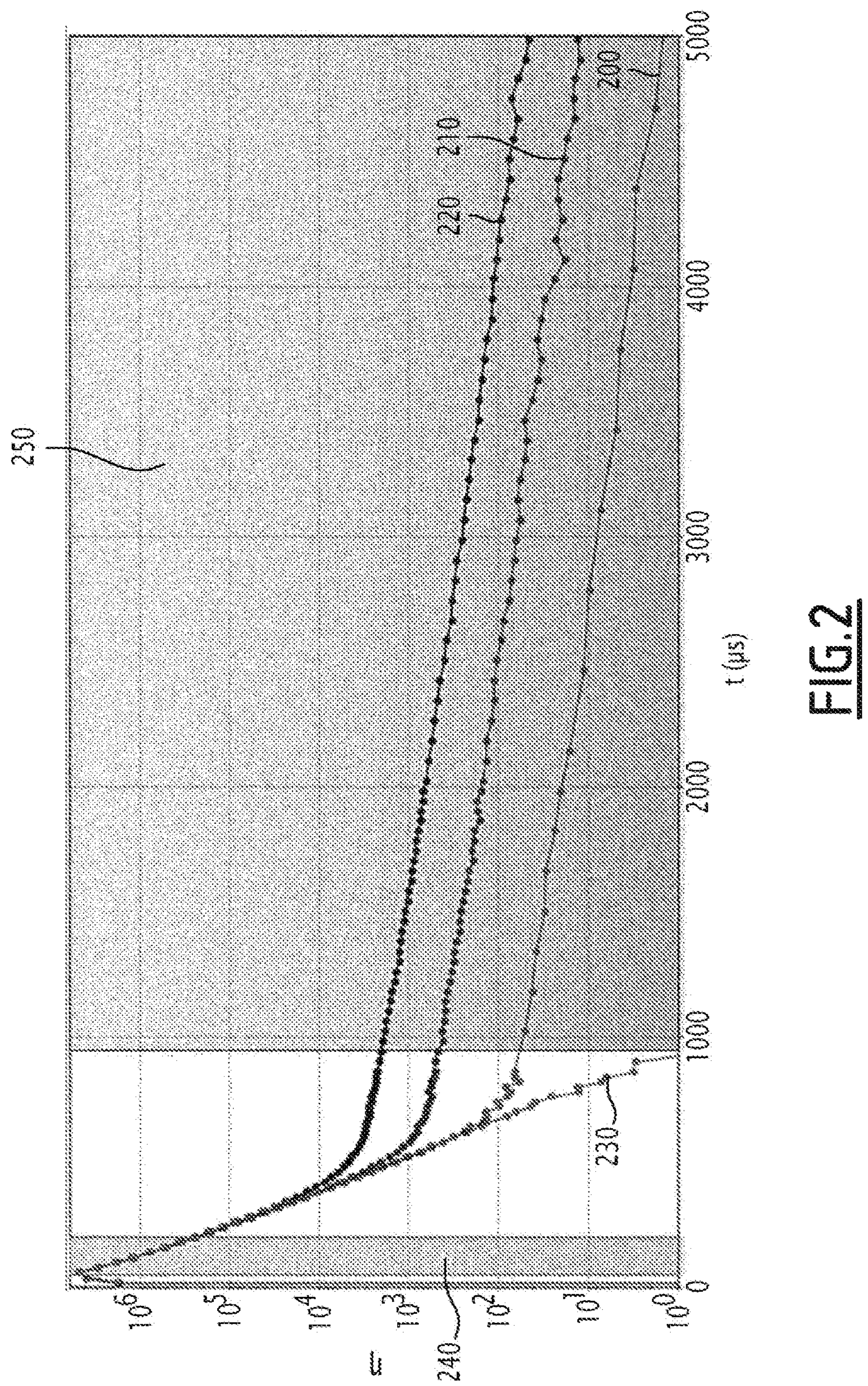
FIG. 2 is an example of a timing diagram showing the time evolution of the neutron count after a fast neutron pulse of the generator recorded with the device shown in FIG. 1.

The neutron counting unit 26 is configured to count over time, a number of high-energy neutrons passing through the shielding device 40 detected by the neutron detector 38, more particularly after the emission of a neutron pulse by the neutron generator 36. FIG. 2 shows a plurality of modeled timing diagrams showing the temporal evolution of the number of neutrons measured by the neutron counting unit 26 for different average uranium contents of the region of interest 12. The first curve 200 is a timing diagram for an average uranium content equal to 250 $ppm_U$. The second curve 210 is a timing diagram for an average uranium content equal to 2000 $ppm_U$. The third curve 220 is a timing diagram for an average content equal to 10000 $ppm_U$. The fourth curve 230 represents the active background noise (0 $ppm_U$) generated by the neutron generator 36.

Each timing diagram corresponds to the sum of the neutrons measured over a plurality of pulse emission cycles, e.g. more than 30,000 cycles, by the neutron generator 36. The origin of the times of each of the timing diagrams corresponds to the beginning of each neutron pulse. In the example shown, the duration of the pulse is 50 μs.

The fastest neutrons, i.e. the neutrons measured during and just after the pulse, correspond in particular to the neutrons backscattered by the hydrogen nuclei present in the region of interest. Same form the first part of the measured signal.

As can be seen in FIG. 2, the measured signal corresponding to the backscattered neutrons is independent of the uranium content of the region of interest. The signal is also independent of the temperature of the fluid present in the borehole (usually water) and of the salinity of the fluid.

The neutron counting unit 26 is at least configured to perform a count over time, during a first time interval 240 (FIG. 2), of a plurality of neutrons backscattered by hydrogen nuclei of the region of interest which have been detected by the detector 38. During the first time interval, the plurality of neutrons backscattered by the hydrogen nuclei of the region of interest 12 form the main contribution to the measured signal.

Preferentially, the first time interval 240 is synchronized with the pulse of the neutron generator 36, i.e. the measurement of the number of backscattered neutrons starts from the beginning of the pulse.

The duration of the first time interval 240 is preferentially comprised between the start of the pulse and a few tens of us after the end of the pulse, meaning e.g. between 50 and 200 us as shown in FIG. 2.

The second part of the timing diagram shows the prompt fission neutrons resulting from interactions between neutrons emitted by the neutron generator 36 and uranium nuclei present in region of interest 12. Indeed, after the pulse and for a few hundred microseconds, the active background noise 230 due to the neutrons of the neutron generator 36 which are slowing down but are not yet fully thermalized, remains predominant. However, the contribution to the signal decreases very rapidly.

The number of fission prompt neutrons measured depends on the uranium content of the region of interest 12. The higher the uranium content in the region of interest 12, the higher the number of fission prompt neutrons.

The neutron counting unit 26 is further suitable for counting over time, during a second time interval 250, a plurality of prompt fission neutrons resulting from interactions between the neutrons emitted by the neutron generator 36 and uranium nuclei present in the region of interest 12 that were detected by the detector 38.

The second time interval 250 is subsequent to the first time interval 240. It starts a few hundred microseconds after the pulse, e.g. 900 μs after the pulse, as shown in FIG. 2. The start of the second time interval 250 is e.g. chosen so that the ratio between the signal (coming from prompt fission neutrons) and the active background noise 230 is high, i.e. e.g. greater than 7. The duration of the second time interval 250 is chosen so as to be as long as possible in order to increase the counting statistics. For example, the duration of the second time interval 250 is preferentially comprised between 1 ms and 10 ms, e.g. 4 ms.

According to a first embodiment, the hydrogen porosity evaluation unit 28 is configured to evaluate the hydrogen porosity of the region of interest 12 using a total number of neutrons measured during the first time interval 240.

Figure 3:
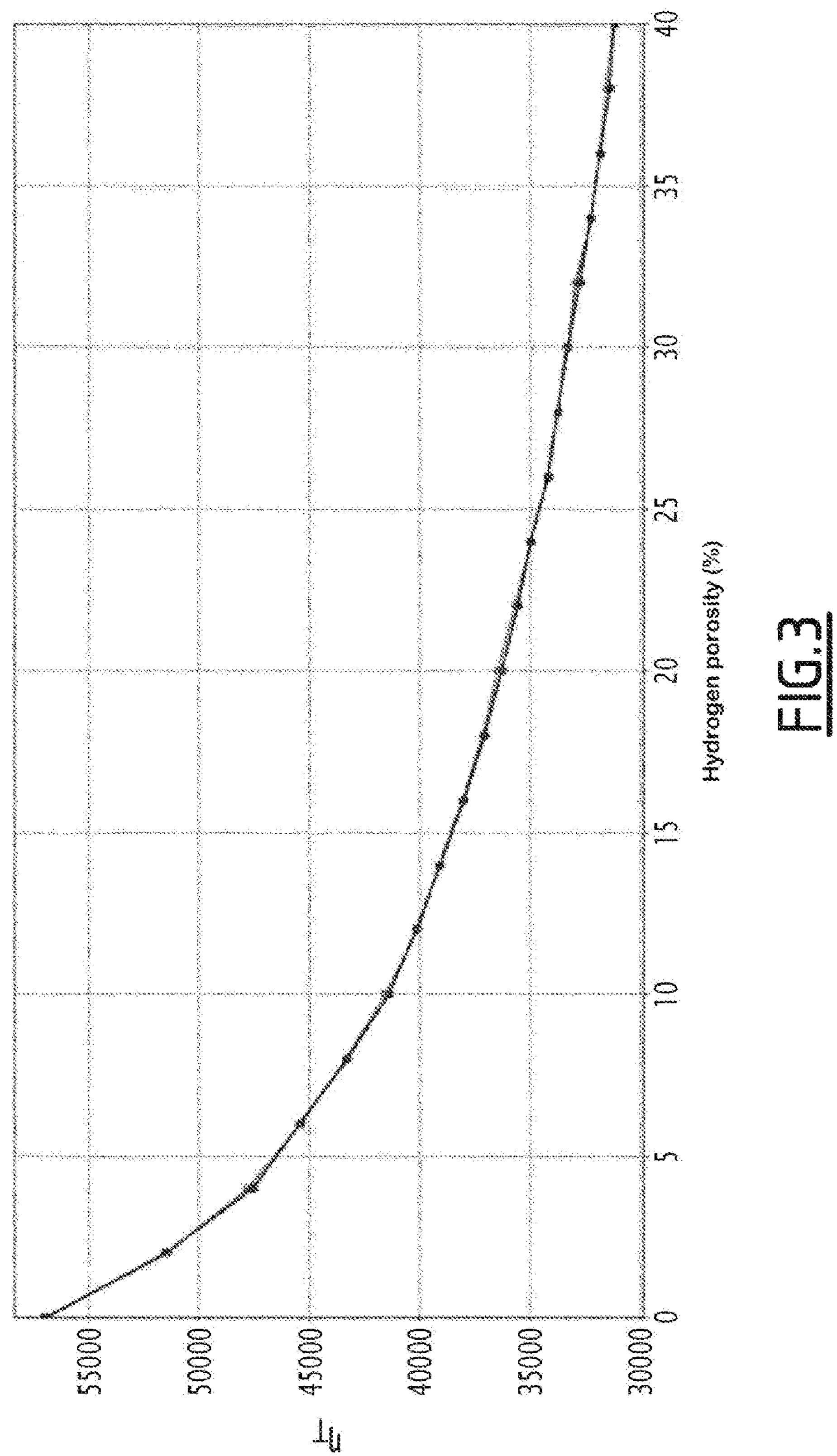
FIG. 3 represents modeled curves showing the relationship between the hydrogen porosity of the region of interest and the total number of neutrons measured during the first time interval by the device shown in FIG. 1 for different uranium contents.

FIG. 3 shows curves relating the total number of neutrons measured during the first time interval 240 to the hydrogen porosity for three distinct uranium contents (10000 $ppm_U$, 2000 $ppm_U$ and 250 $ppm_U$). It can be seen that the three curves are substantially merged. The above confirms that the total number of neutrons measured during the first time interval 240 is independent of the uranium content in the region of interest 12. Over the porosity range represented, i.e. between 0 and 40%, the curves are perfectly bijective, i.e. a value of the total number of neutrons measured during the first time interval 240 corresponds to a single value of hydrogen porosity. It is thus possible to unequivocally determine the hydrogen porosity from the total number of neutrons measured during the first time interval 240. The relation between the total number of neutrons measured during the first time interval 240 and the porosity depends on the geometry of the device 10 which can be determined e.g. via numerical simulations with the MCNP code.

The uranium content evaluation unit 30 is configured to evaluate the uranium content of the region of interest 12 using a total number of neutrons measured during the second time interval 250.

Figure 4:
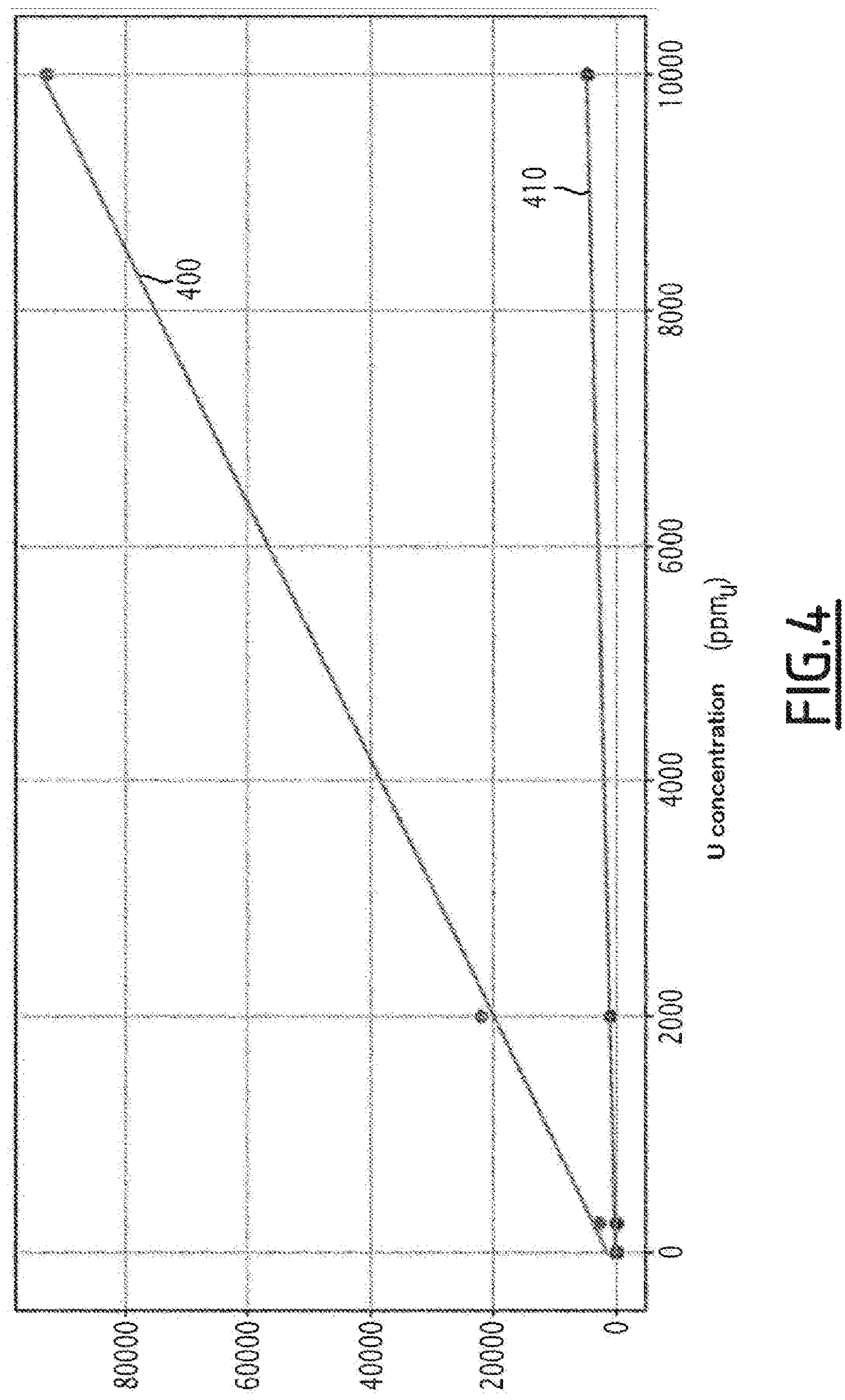
FIG. 4 shows modeled curves showing the relationship between the uranium content of the region of interest and the total number of neutrons measured during the second time interval by the device shown in FIG. 1 for different porosities.

FIG. 4 shows the relation between the total number of neutrons measured during the second time interval 250 and the uranium content of the region of interest 12 for a hydrogen porosity of 0% (curve 400) and a hydrogen porosity of 40% (curve 410). It can be seen that in each case, for a given hydrogen porosity, the total number of neutrons measured during the second time interval is linearly related to the uranium content of the region of interest 12. In other words, the uranium content evaluated by the uranium evaluation unit 30 is substantially proportional to the total number of neutrons measured during the second time interval 250.

Thereby, once the hydrogen porosity has been determined by the hydrogen porosity evaluation unit 28, the relation between the total number of neutrons measured during the second time interval 250 and the uranium content of the region of interest 12 can be modeled, still using e.g. the MCNP modeling code. Then, from the total number of neutrons measured during the second time interval 250, the uranium content of region of interest 12 can be determined. Thereby, the uranium evaluation unit 30 is configured to determine the uranium content using the hydrogen porosity evaluated by the hydrogen porosity evaluation unit 28.

A borehole evaluation method of a uranium content and of a hydrogen porosity of a region of interest 12 of a geological formation, using an evaluation device 10 as described hereinabove, will now be described.

The probe 16 is first lowered into the borehole 14 so as to place the probe opposite the region of interest 12.

At least one neutron pulse is then emitted, a part of which is directed toward the region of interest 12 using the neutron generator 36. Preferentially, as indicated above, a plurality of neutron pulses are emitted in the form of a periodic signal.

A number of neutrons passing through the shielding device 40 is then measured as a function of time, after each pulse, using the neutron counting unit 26. More particularly, a first measurement is made during the first time interval 240 by measuring a number of neutrons backscattered by hydrogen nuclei of the region of interest, and a second measurement is then made by measuring during the second time interval 250, a number of prompt fission neutrons resulting from interactions between neutrons emitted by the neutron generator and uranium nuclei present in the region of interest.

In other words, for each neutron pulse emitted, a first measurement is successively carried out which consists in measuring, during the first time interval 240, the number of neutrons backscattered, and a second measurement which consists in measuring, during the second time interval 250, the number of prompt fission neutrons.

A series of first measurements and a series of second measurements are thereby obtained after the emission of the plurality of pulses.

The hydrogen porosity of the region of interest 12 is then evaluated using the series of first measurements. Indeed, as indicated hereinabove, the relation between the total number of neutrons measured during the first time interval 240 and the hydrogen porosity of the region of interest 12 is bijective. The relation is independent of the uranium content of the region of interest 12.

The uranium content of the region of interest is then evaluated using the second series of measurements. The relation between the total number of neutrons measured during the second time interval 250 and the uranium content of the region of interest 12 is bijective and linear.

Preferentially, the evaluation of the uranium content is performed using the hydrogen porosity evaluated with the first count.

According to an advantageous embodiment, the hydrogen porosity evaluation unit 28 is configured to correct the uranium content which has been evaluated using a parameter representative of the variation over time of the number of neutrons during the second time interval 250.

Indeed, the variation over time of the number of neutrons during the second time interval 250 depends strongly on the neutron absorber content in the region of interest 12. Neutron absorbers include, but are not limited to, elements present in the region of interest 12, such as e.g. hydrogen, boron, chlorine, and uranium in high concentrations (>10, 000 ppm).

Figure 5:
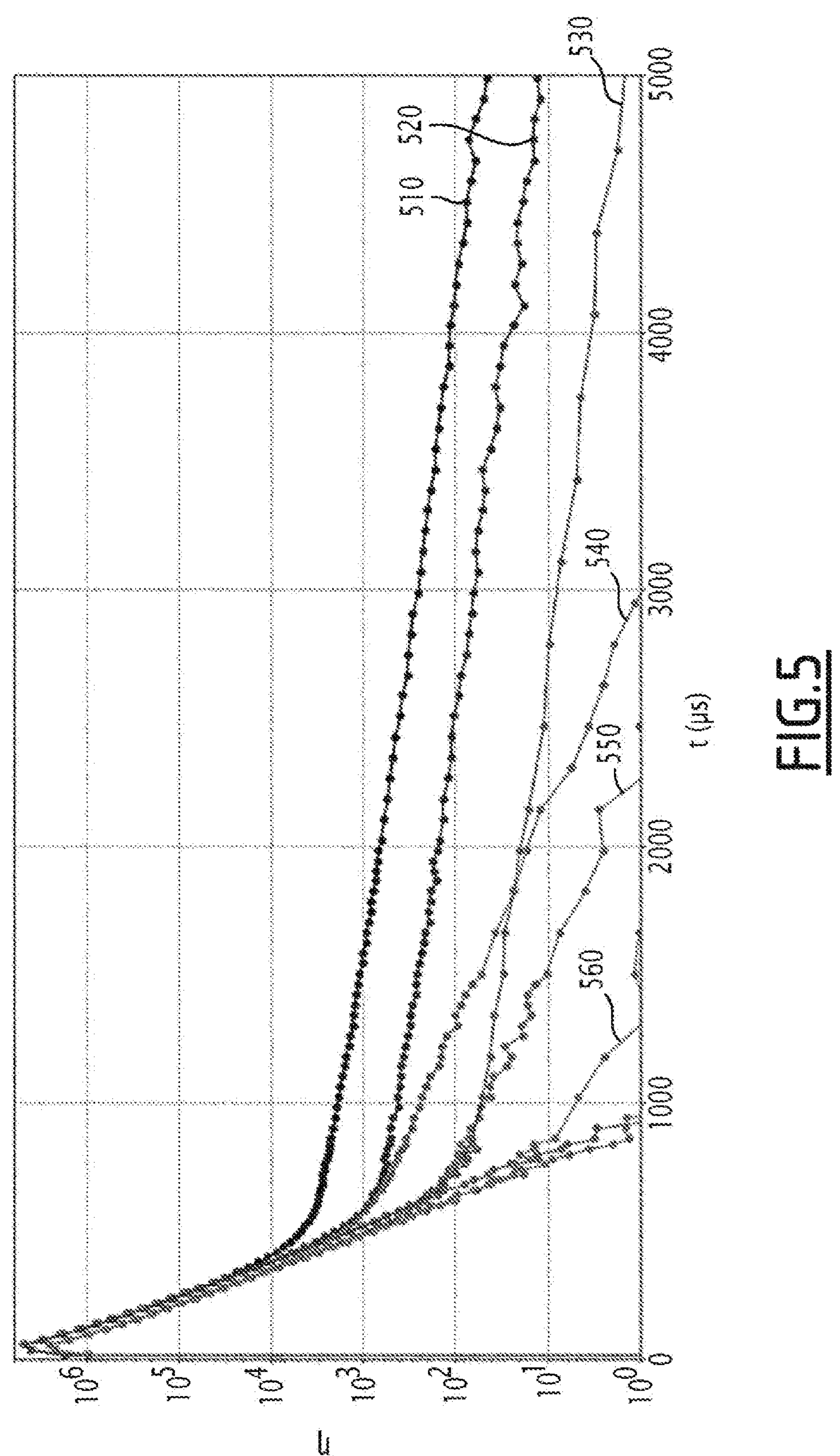
FIG. 5 represents timing diagrams showing the variation in time of the neutron counting recorded with the device shown in FIG. 1 for different uranium contents and hydrogen porosities.

Thereby, the parameter representative of the variation over time of the number of neutrons during the second time interval 250 characterizes the total neutron absorption cross section σ. FIG. 5 shows the time variation of the number of neutrons measured by the neutron counting unit 26 for regions of interest 12 with different uranium contents and different porosities. More particularly, curves 510, 520 and 530 represent the number of neutrons measured for zero porosity and a uranium content equal to 10,000 $ppm_U$, 2,000 $ppm_U$ and 250 $ppm_U$, respectively. Curves 540, 550 and 560 represent the number of neutrons measured for a porosity equal to 40% and a uranium content equal to 10,000 $ppm_U$, 2,000 $ppm_U$ and 250 $ppm_U$, respectively.

In the example shown in FIG. 5, the only neutron absorber in the region of interest 12 is considered to be hydrogen present in water.

It can be seen that in FIG. 5, on which the number of neutrons measured is represented on a logarithmic scale, the slope of curves 510 to 560 over the second time interval 250 is identical for the same hydrogen porosity value, irrespective of the uranium content of the region of interest 12.

Thereby, over the second time interval 250, the time variation of the number of neutrons is an exponential decrease. The number of neutrons on the second time interval 250 is related to time by the equation:

$$C(t) = A_0 e^{-t/\tau(\sigma)}$$

C(t) the number of neutrons over the second time interval 250.

$A_0$ is a constant.

t is time.

$\tau(\sigma)$ is the time constant.

$\sigma$ is the total neutron absorption cross section.

The representative parameter used to correct the uranium content is e.g. a parameter representative of the time constant $\tau(\sigma)$. Indeed, the time constant depends on the total neutron absorption cross section of the region of interest 12 which, at low uranium concentration (<10,000 ppm), does not depend on the uranium content.

For example, a correction coefficient is determined by numerical simulation, for correcting the evaluated uranium content value for the total neutron absorption cross section.

As mentioned hereinabove, in each of the embodiments described, preferentially, during the acquisition of the measurements, the probe 16 is pressed against the internal wall 34 of the borehole 14, e.g. by means of the eccentric part 32.

However, in the case where there is a spacing between the probe 16 and the inner wall 34 of the borehole 14, advantageously, the hydrogen porosity is evaluated by further using a measurement of the distance between the probe 16 and the inner wall 34 of the borehole 14. Indeed, the distance between the probe 16 and the inner wall 34 of the borehole 14 affects the evaluated hydrogen porosity value in a linear manner. The greater the distance between the probe 16 and the inner wall 34 of the borehole 14, the more the hydrogen porosity value is overestimated. It is thus possible by numerical simulation to determine a correction coefficient for correcting the value of hydrogen porosity evaluated, so as to take into account the distance between the probe 16 and the internal wall 34 of the borehole 14.

Thereby, the device according to the present disclosure is particularly advantageous because same serves to evaluate the uranium content and the hydrogen porosity in a borehole with a single tool, from measurements over one or two time intervals. The measurements obtained are reliable and accurate because the acquisition geometry is identical for both measurements. The device takes little space and can be used e.g. to add other detectors near the neutron generator, so as to perform supplementary characterization measurements. Finally, the use of a single tool to perform both a porosity measurement and a uranium content measurement reduces acquisition times.

What is claimed is:

1. A device for the borehole evaluation of a uranium content and a hydrogen porosity of a region of interest of a geological formation, the device comprising:

a probe intended to be inserted into a borehole facing the region of interest, the probe including a pulsed neutron generator configured to emit at least one neutron pulse, at least some of said neutrons being emitted toward the region of interest, a single neutron detector arranged offset from the pulsed neutron generator, said neutron detector being suitable for detecting a plurality of neutrons resulting from interactions between neutrons emitted by the pulsed neutron generator and the region of interest, the probe further comprising a shielding device surrounding the neutron detector, the shielding device being suitable for absorbing a plurality of neutrons having an energy less than a cutoff energy, and resulting from interactions between the neutrons emitted by the pulsed neutron generator and the region of interest;

a neutron counting unit connected to the neutron detector, the neutron counting unit being at least configured to measure, over time, during a first time interval, a number of neutrons backscattered by hydrogen nuclei of the region of interest and to measure, over time, during a second time interval, a number of prompt fission neutrons resulting from interactions between the neutrons emitted by the pulsed neutron generator and uranium nuclei present in the region of interest, the second time interval being subsequent to the first time interval;

a hydrogen porosity evaluation unit configured to evaluate the hydrogen porosity of the region of interest using a total number of neutrons measured during the first time interval; and a uranium evaluation unit configured to evaluate the uranium content of the region of interest using a total number of neutrons measured during the second time interval.

2. The device according to claim 1, wherein the probe comprises a moderator arranged between the shielding device and the neutron detector, the moderator being suitable for slowing down neutrons having passed through the shielding device.

3. The device according to claim 1, wherein the pulsed neutron generator and the neutron detector extend along a direction substantially merged with or parallel to a main elongation direction of the probe.

4. The device according to claim 1, wherein the uranium content evaluated by the uranium evaluation unit is proportional to the total number of neutrons measured during the second time interval.

5. The device according to claim 1, wherein the uranium evaluation unit is configured to determine the uranium content using the hydrogen porosity evaluated by the hydrogen porosity evaluation unit.

6. The device according to claim 1, wherein the uranium evaluation unit is configured to correct the evaluated uranium content using a parameter representative of the variation over time of the number of prompt fission neutrons measured during the second time interval.

7. The device according to claim 1, wherein the hydrogen porosity evaluation unit is further configured to evaluate the hydrogen porosity using a distance between the probe and an inner wall of the borehole.

8. A method of borehole evaluation of a uranium content and a hydrogen porosity of a region of interest of a geological formation, using the device according to claim 1, the method comprising the following steps:

emitting at least one neutron pulsed with the neutron generator, at least some of said neutrons being emitted toward the region of interest;

performing at least one first measurement, the first measurement comprising a measurement during the first time interval of a number of backscattered neutrons resulting from interactions between neutrons of the at least one neutron pulse and hydrogen nuclei of the region of interest;

performing at least one second measurement, the second measurement comprising a measurement during the second time interval of a number of prompt fission neutrons resulting from interactions between neutrons of the at least one neutron pulse and uranium nuclei present in the region of interest;

evaluating the hydrogen porosity of the region of interest using the first measurement; and evaluating the uranium content of the region of interest using the second measurement.

9. The method according to claim 8, wherein the evaluation of the uranium content is performed using the evaluated hydrogen porosity.

10. The method according to claim 8, wherein the hydrogen porosity evaluation is performed using a distance between the probe and a wall of the borehole.

* * * * *